United States Patent Office 3,392,659
Patented July 16, 1968

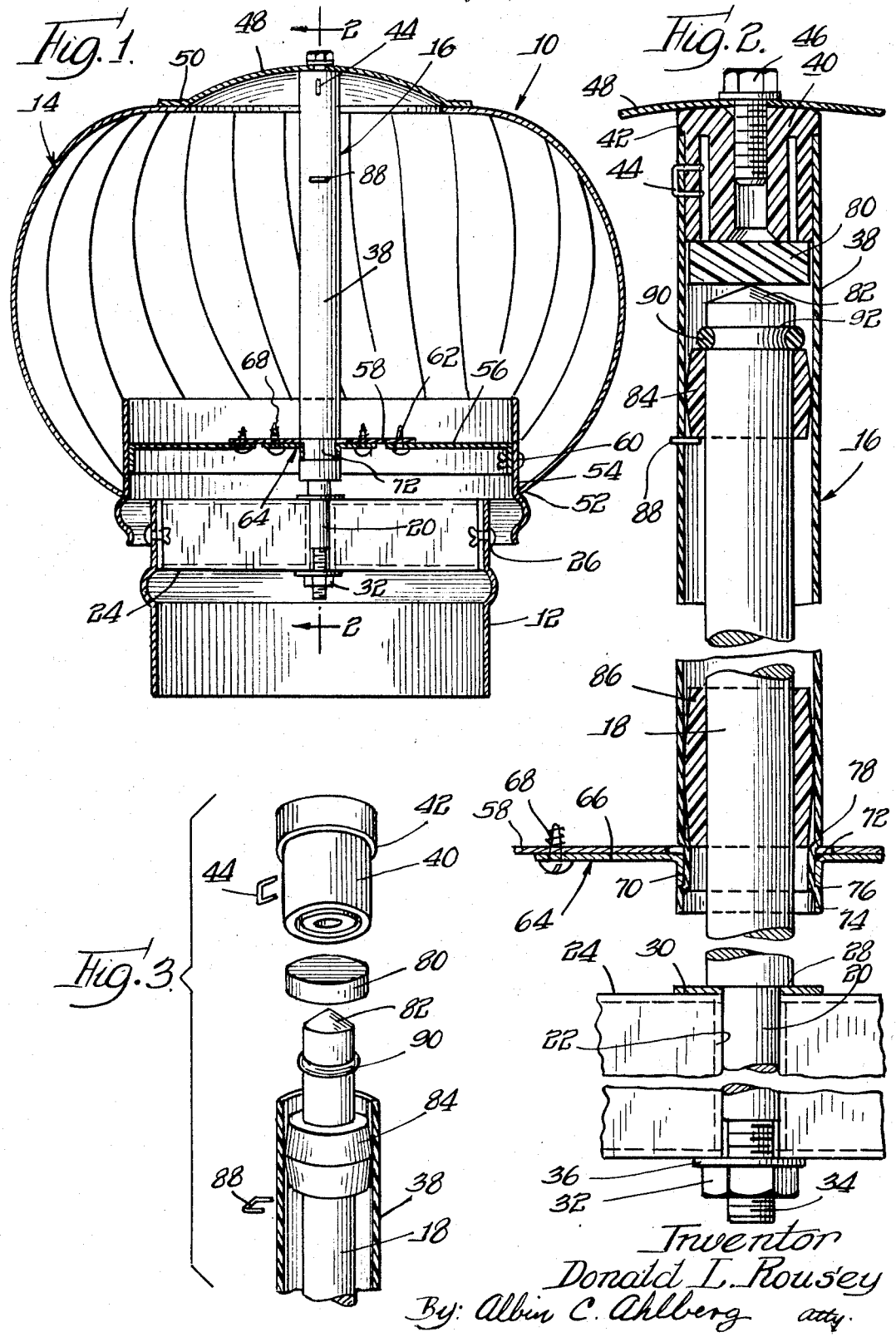

3,392,659
TURBINE VENTILATOR HAVING SELF-ALIGNING BEARINGS
Donald L. Rousey, Des Plaines, Ill., assignor to Leslie Welding Co., Inc., Franklin Park, Ill., a corporation of Delaware
Filed July 18, 1966, Ser. No. 570,115
8 Claims. (Cl. 98—72)

ABSTRACT OF THE DISCLOSURE

A turbine ventilator having a turbine head supported by an upwardly extending central shaft. A plastic tube is telescoped over the shaft and connected at upper and lower ends to the turbine head. Upper and lower self-aligning sleeve bearings are positioned within the tube around the shaft and the vertical thrust is absorbed by a flat disc engaging an upper pointed end of the shaft. All of the bearings and the tube are formed from plastic.

---

The present invention relates to a novel ventilator structure, and more specifically to a novel rotary turbine ventilator.

An object of the present invention is to provide a novel turbine ventilator constructed so as to assure free movement between relatively rotatable parts even after long exposure to the weather.

Another important object of the present invention is to provide a novel rotary turbine ventilator which may be relatively easily and economically constructed and assembled.

Other objects and advantages of the present invention will become apparent from the following description and the accompanying drawings wherein:

FIG. 1 is a partial sectional view showing a turbine ventilator incorporating features of the present invention;

FIG. 2 is an enlarged fragmentary partial sectional view taken along line 2—2 in FIG. 1; and FIG. 3 is a fragmentary exploded perspective view showing an upper bearing construction of the turbine unit.

Referring now more specifically ot the drawings, wherein like parts are designated by the same numerals throughout the various figures, a turbine unit 10 incorporating features of the present invention is shown in FIG. 1. The unit 10 comprises a generally cylindrical base member 12. A vaned head member 14 is rotatably supported above the base member 12 by assembly 16 constructed in accordance with the features of the present invention described in detail below.

The assembly 16 comprises a vertically upwardly extending center post or shaft 18 having a reduced diameter lower end portion 20 extending into a socket 22 provided in a cross support structure 24. The cross support structure is secured within the base 12 by suitable fastening devices 26. A shoulder 28 on the shaft engages a washer 30 for preventing downward movement of the shaft. A nut 32 is turned onto a threaded lower end 34 of the shaft for securing the shaft into position. Preferably a washer 36 is provided between the nut and the lower side of the cross support structure 24.

A tube or sleeve 38 is telescoped over the shaft 18 and carries the vaned head member in the manner described below. The tube is formed from a weather resistant tough plastic resinous material which is substantially rigid but at least slightly resiliently yieldable. Antifriction bearing means are provided between the tube and the shaft for relative to the shaft.

A cap or plug member 40 is inserted into the upper end of the tube and is formed with a shoulder 42 for limiting downward movement within the tube. A staple or fastener 44 driven through the wall of the plastic tube 38 secures the part with respect thereto. Removably secured to the cap or plug 40 by a screw 46 is a disc member 48 having a peripheral portion 50 which is welded or otherwise connected to the vaned head member 14.

A lower end portion of the vaned head member is interconnected with a lower end portion of the tube or sleeve 38 as shown in FIG. 1. More specifically, a lower margin 52 of the vaned head member rests on an annular head formed on a cylindrical member 54 which encircles the base member 12 in spaced relationship thereto. If desired, the head margin 52 may be welded or otherwise secured to the member 54. A spider comprising a plurality of arms 56 and a central disc 58 extends between the cylindrical member 54 and the sleeve or tube 38. Outer ends of the arm 56 are secured to the cylindrical member 54 by suitable rivets or other fastening devices 60 and inner ends of the arms are fixed to the disc 58 by rivets or fasteners 62.

The spider disc 58 is fixed with respect to the lower end of the sleeve or tube 38 by a flanged anchor member 64. As shown best in FIG. 2, the anchor member 64 has an annular radially extending section 66 which is fastened to the disc 58 by sheet metal screws 68 or other suitable fastening devices. An inner margin of the anchor member is formed with an axially extending flange 70 having an internal diameter less than the normal outside diameter of the tube or sleeve 38. The anchor member is pressed onto the lower end of the plastic sleeve 38.

The tough plastic material of the sleeve is resiliently yieldable so that when the anchor member is positioned as shown in FIG. 2, the material yields to form an inwardly projecting annular rib 72 conforming to the flange 70 of the anchor member. In addition, a lower terminal end portion 74 of the sleeve resiliently expands substantially to its original diameter after the anchor member has been pressed to the position shown so as to form a shoulder 76 cooperating with the similar shoulder 78 at an upper side of the anchor member where the rib section 72 joins the remainder of the tube for positively locking the anchor member against further axial displacement in either direction relative to the tube or sleeve.

A thrust bearing disc 80 is disposed within the sleeve in abutting relationship to the lower end of the plastic cap member 40. The disc 80 is formed from a plastic resin material, such as nylon or an acetal resin having polytetrafluoroethylene mixed therein, having antifriction characteristics. The disc 80 engages an upper end 82 of the shaft, which upper end is pointed as shown in FIG. 2 for minimizing frictional contact with the bearing disc.

In order to accommodate lateral loads, sleeve bearings 84 and 86 are disposed between the shaft 18 and upper and lower portions of the tube or sleeve 38. The bearings 84 and 86 are also formed from a plastic material having antifriction characteristics. For example, the bearings 80, 84 and 86 may be formed from nylon or a composition comprising a polytetrafluoroethylene in a thermoplastic acetal resin.

The bearing 84 is positively secured against downward movement by an element such as a staple 88 driven through the wall of the plastic tube 38 and projecting beneath and engaging the lower end of the bearing. Upward movement of the bearing 84 and the entire turbine head assembly with respect to the shaft 18 is restrained by a ring 90 seating within a groove 92 formed in an upper end portion of the shaft. As shown in FIG. 2 the ring 90 extends over and engages the upper end of the bearing 84. The bearing 86 is positively retained within the tube or sleeve 38 by the upwardly facing side of the shoulder 78 which is formed when the anchor member 64 is pressed onto the lower end of the tube.

The bearings 84, 86 are initially positioned within the tube or sleeve 38 with a force fit. As shown best in FIG. 2, both of the bearings 84 and 86 have outer surfaces which are rounded or tapered in an axial direction. More specifically, both of the bearings 84 and 86 have outer surfaces with the maximum diameter adjacent a midpoint thereof and the surfaces taper from such midpoint toward the opposite ends of the bearings. With this arrangement, the bearing members 84 and 86 are adapted to pivot or turn relative to the tube or sleeve 38 about axes extending transversely of the tube so as to enable the longitudinal axes of the bearing elements to align with each other. In other words, when the bearing assembly is applied to the shaft 18, the bearing units 84 and 86 are adapted to turn relative to the tube and to each other, if necessary, until they are properly aligned. This self-aligning action is obtained automatiaclly upon assembly of the bearings with the shaft and aids in assuring free rotation of the turbine head with respect to the shaft.

The bearing elements 80, 84 and 86 are sufficiently fixed with respect to the sleeve 38 so that they rotate with the turbine around the shaft. In somewhat similar installations utilizing bearings having an oil or fluid lubricant, it has been found that centrifugal force causes the lubricant to flow outwardly away from the bearing surfaces so as to minimize its lubricating effect. In the present structure the polytetrafluoroethylene antifriction material is solid and permanently retained in fixed relationship in the acetal resin or other plastic material of the bearing elements whereby the lubricating characteristics of the bearing elements are unaffected by centrifugal force.

While a preferred embodiment of the present invention has been shown and described herein, it is obvious that many structural details may be changed without departing from the spirit and scope of the appended claims.

What I claim as new, and desire to secure by United States Letters Patent, is:

1. A turbine ventilator comprising support means, a shaft secured to and extending upwardly from said support means, a tube of tough resiliently yieldable material telescoped over said shaft and projecting thereabove, a thrust bearing disc mounted within said tube above and including a substantially flat surface axially engaging an upper end of said shaft, a first sleeve bearing separate from said disc disposed within said tube and engaging an upper end portion of said shaft beneath said thrust-bearing disc, a second sleeve bearing disposed within said tube substantially below said first sleeve bearing and engaging said shaft, each of said sleeve bearings having an outer surface tapering toward opposite ends from an intermediate area thereof, said sleeve bearings being movable about transverse axes within said tube for self alignment upon assembly with said shaft, and a turbine head carried by said tube.

2. A turbine ventilator as defined in claim 1, wherein said bearing disc and sleeve bearings are made of a solid material including an antifriction plastic resinous material.

3. A turbine ventilator as defined in claim, wherein said tube is made of a plastic resinous material.

4. A turbine ventilator as defined in claim 1, which includes a spider structure extending between said tube and said turbine head, said spider structure including an annular anchor portion having an internal diameter less than an initial outside diameter of said tube, said anchor portion being pressed onto said tube, said tube having an inwardly projecting annular rib conforming to and positively retaining said anchor member against displacement axially of the tube.

5. A turbine ventilator as defined in claim 4, wherein said annular rib presents an upwardly facing shoulder engaging beneath said second sleeve bearing and retaining said second bearing against downward movement within the tube.

6. A turbine ventilator as defined in claim 1, wherein said shaft includes a substantially pointed upper end engaging said thrust-bearing disc.

7. A turbine ventilator comprising support means, a shaft secured to and extending upwardly from said support means, a tube telescoped over said shaft and projecting thereabove, a thrust-bearing disc mounted within said tube above and axially engaging an upper end of said shaft, a first sleeve bearing disposed within said tube and engaging an upper end portion of said shaft beneath said thrust-bearing disc, a second sleeve bearing disposed within said tube substantially below said first sleeve bearing and engaging said shaft, a turbine head carried by said tube, an element projecting through a wall of said tube and beneath a lower end of said first sleeve bearing for restraining said first sleeve bearing against downward movement within the tube, said shaft having annular groove means therein above said first sleeve bearing, and ring means seated in said groove and projecting over said first sleeve bearing for restraining said first sleeve bearing against upper movement relative to the shaft.

8. A turbine ventilator as defined in claim 7, which includes a plastic cap member secured within an upper end of said tube, and means detachably connecting an upper end of said turbine head to said cap member.

References Cited

UNITED STATES PATENTS

| | | | |
|---|---|---|---|
| 535,276 | 3/1895 | Doerge | 98—75 |
| 2,576,124 | 11/1951 | Kinsbury | 308—152 XR |
| 2,953,079 | 9/1960 | Kastner | 98—75 |
| 3,002,794 | 10/1961 | Blueming | 308—72 |
| 3,252,742 | 5/1966 | Swanstrom | 308—72 |
| 3,267,833 | 8/1966 | Artis et al. | 98—72 |

ROBERT A. O'LEARY, *Primary Examiner.*

M. A. ANTONAKAS, *Assistant Examiner.*

UNITED STATES PATENT OFFICE
CERTIFICATE OF CORRECTION

Patent No. 3,392,659                                July 16, 1968

Donald L. Rousey

It is certified that error appears in the above identified patent and that said Letters Patent are hereby corrected as shown below:

Column 1, lines 69 to 71, cancel "relative to the shaft. A cap or plug member 40 is inserted into the upper enabling the tube and thus the vaned head to rotate freely" and insert -- enabling the tube and thus the vaned head to rotate freely relative to the shaft. A cap or plug member 40 is inserted into the upper --.
Column 4, line 4, after "claim" insert -- 2 --.

Signed and sealed this 30th day of December 1969.

(SEAL)
Attest:

Edward M. Fletcher, Jr.                        WILLIAM E. SCHUYLER, JR.

Attesting Officer                                   Commissioner of Patents